US006298564B1

United States Patent
Voser et al.

(10) Patent No.: US 6,298,564 B1
(45) Date of Patent: Oct. 9, 2001

(54) PORTABLE HAND SAW (75) Inventors: Rudy Voser, 1886 Belle Isle Place, North Vancouver, British Columbia (CA), V7P 1X8; Walter Frei, Gebenstorf (CH)

(73) Assignee: Rudy Voser (CA)

( * ) Notice: Subject to any disclaimer, the term of this patent is extended or adjusted under 35 U.S.C. 154(b) by 0 days.

(21) Appl. No.: 09/135,790

(22) Filed: Aug. 18, 1998

(30) Foreign Application Priority Data

Aug. 18, 1997 (CH) .................................................. 1930/97

(51) Int. Cl.$^7$ .................................................. B27B 21/02
(52) U.S. Cl. ................................. 30/512; 30/506; 30/513
(58) Field of Search ............................ 30/512, 506–507, 30/513

(56) References Cited

U.S. PATENT DOCUMENTS

| Re. 5,674 | * | 12/1873 | Moore | 30/506 |
|---|---|---|---|---|
| 177,243 | * | 5/1876 | Hayten et al. | 30/506 |
| 739,241 | * | 9/1903 | Way | 30/506 |
| 2,399,541 | * | 4/1946 | Clark | 30/506 |
| 2,667,195 | * | 1/1954 | Kilmer | 30/506 |
| 3,149,652 | * | 9/1964 | Swenson | 30/512 |
| 3,905,409 | | 9/1975 | Bradley | 30/512 |
| 3,908,726 | * | 9/1975 | Swenson | 30/512 |
| 3,954,127 | | 5/1976 | Doxon | 30/506 |
| 4,186,785 | | 2/1980 | Bilsback | 30/506 |
| 4,287,922 | | 9/1981 | Nelson | 30/506 |
| 4,580,344 | | 4/1986 | Jinghage et al. | 30/512 |
| 4,637,141 | | 1/1987 | Allen | 30/512 |

FOREIGN PATENT DOCUMENTS

| 889673 | | 1/1972 | (CA) . | |
|---|---|---|---|---|
| 28369 | * | 10/1956 | (FR) | 30/507 |

* cited by examiner

*Primary Examiner*—Charles Goodman
(74) *Attorney, Agent, or Firm*—Clifford W. Vermette (57) ABSTRACT

The present invention is a lightweight collapsible hand saw for use when camping, hiking or otherwise. The saw breaks down and can be consolidated into a single tubular shape, with all of the components fitting inside the tube. In the functional configuration, a triangular saw may be constructed out of two tubular members having different diameters, a saw blade and a tightening element. Alternatively, both a triangular saw and a buck saw may be constructed out of three tubular members having different diameters, a saw blade and a tightening element. The tubular members form the frame of the saw and contain slots for inserting the saw blade. The tightening element is provided to give the saw the necessary rigidity and impart the necessary tension on the blade. In addition, the apparatus can be used to form a campfire cooking utensil with a number of accessorising elements.

28 Claims, 4 Drawing Sheets

PORTABLE HAND SAW

RELATED APPLICATION

The invention herein disclosed is related to the Swiss patent application number 1997 1930/97, filed Aug. 18 1997, and claims priority on that application.

FIELD OF THE INVENTION

The invention relates to a hand saw. Specifically, the invention is a portable, lightweight, collapsible hand saw that can be used as a triangular or buck saw and may further be converted into a campfire cooking utensil with the addition of a number of accessories.

BACKGROUND OF THE INVENTION

The prior art in hand saws includes three basic designs. The first and most common design involves a saw with a rigid frame in which the blade is tensioned at the ends so as to secure it in place. This type of saw is the most common variety of hand saw used for domestic and industrial purposes. The drawback with the rigid frame saw is that the blade is always exposed and the saw is not collapsible. Consequently, rigid frame saws are ideal for domestic and industrial use where portability is not required.

The second hand saw design involves a hand saw frame which includes hinges and can be folded and compacted via the hinge mechanism. The hinged frame provides for a hand saw that can be somewhat compact and portable. U.S. Pat. Nos. 4,580,344 (issued to Jinghage et al.), 3,905,409 (issued to Bradley), and 3,954,127 (issued to Doxon) disclose hinged frame saws. The Jinghage and Bradley saws are foldable triangular saws and the Doxon saw is a foldable bow saw. The Jinghage, Bradley and Doxon designs suffer from the typical drawbacks associated with hinged frame saws. The disadvantages include:

(i) the saws are relatively wide, making them more cumbersome, because the parts of a hinged saw frame fold in on one another and so must accommodate the other parts of the saw;

(ii) hinged saws are generally restricted to light duty saws, because they lack the sturdiness and rigidity required for a heavy duty sawing, particularly in the hinge region, which is under a great deal of stress; and (iii) the addition of the hinge increases the overall weight, reducing the saw's portability.

The third hand saw design involves frames that are assembled from separate or severable components and are collapsible so as to remain easily portable. Once again, these designs are principally used for buck saws or triangular saws.

U.S. Pat. Nos. 4,287,922 (issued to Nelson), 4,186,785 (issued to Bilsback)and Canadian Patent No. 889,673 (issued to Moss). concern collapsible buck saws made from separate or severable parts. For these patents, the saw design includes a collapsed state, wherein all of the buck saw parts fit into the interior of the hollow tubular frame members, making the collapsed assembly easily portable.

Nelson discloses a buck saw having a single tubular cross member, with two pairs of support bars hinged onto the saw blade and shaped so as to slide perpendicularly through openings in the cross member. The Nelson apparatus is tensioned only by a loop of twine, which secures the support bars. Although the twine tension mechanism is extremely lightweight, the tension achievable in the Nelson design, is severely limited. Furthermore, the support bars provided for by the Nelson saw are not comfortable hand grips. These disadvantages make the Nelson buck saw suitable for only the most light duty sawing.

Bilsback discloses a buck saw that also has two tubular support bars, which form the handles of the saw when constructed. The support bars each have slots at one end that receive the saw blade. A rod shaped tensioner and a tubular cross members provide the support and tension for the apparatus. The cross member, is pushed into an aperture in the middle of each of the support bars and is used to maintain the separation of the support bars. The tensioner is located at the end of the support bars opposite to the saw blade. The tensioner, in combination with two thumb nuts, is operative to pull the support bars together and to exert outward tension on the saw blade. The problems with Bilsback include:

(i) the saw blade requires washers, which are attached to the blade by rivets. Over time, the washers can become worn and break or bend;

(ii) the thumb nuts could easily become lost on a hiking trip, rendering the saw useless;

(iii) the Bilsback saw has poor vertical clearance between the saw blade and the cross member; and (iv) in the compact mode, the thumb nuts on either side of the compacted tube add to its overall length.

The Moss saw uses a large support bar with a closed end that is longer than all of the other saw elements including the saw blade. In the collapsed configuration, all of the elements of the Moss saw are longitudinally inserted into the large support bar. A smaller support bar with a closed end is slidably inserted into the large support bar and fastened with a small clip. In the functional configuration, the saw includes a tensioner that goes through one of the support bars and hooks to the second support bar of the saw, and puts the necessary tension on the saw blade. The disadvantages with the Moss saw include:

(i) the large support bar is very long and heavy (even in the collapsed configuration) because it must contain all of the other saw elements consequently, the support bar extends below the saw blade limiting the use of the saw, particularly for making flush cuts;

(ii) the clip used to maintain the saw in the collapsed configuration may become easily lost; and (iii) the support bars have flat ends which are not shaped to be received by the handles; consequently, the frame is not very rigid and the saw blade may experience considerable torque because of the twisting frame.

U.S. Pat. Nos. 3,905,409 (issued to Bradley) and 4,637,141 (issued to Allen) disclose collapsible triangular saws. Once again, the saws are collapsible so that all of the saw parts for each saw fit into a singular tubular shape that is also used to form part of its frame.

The Bradley saw is partially collapsible and partially hinged. The saw blade is attached to a brace bar with a special hook, such that it can be positioned at an angle with respect to the brace bar when in the functional configuration. One end of a tubular handle adjoins the brace bar at the side opposite the saw blade and forms a perpendicular angle therewith. The bottom end of the tubular handle is coupled to the second end of the saw blade with a hinged thumb screw/butterfly nut assembly. In this manner, the saw blade, brace bar and tubular handle form a functional triangular saw. When in storage mode, the brace bar and the saw blade slide longitudinally into the tubular handle. The thumbscrew/butterfly nut assembly is then used to secure the pieces in place so that the saw may be easily transported. The problems with the Bradley design include:

(i) the thumb screw/butterfly nut assembly adds extra length to the collapsed state;
(ii) the possibility for the thumbscrew/butterfly nut assembly to become lost; and
(iii) the lack of strength in the relatively flat brace bar.

The Allen saw consists of two tubular pieces of different diameter such that one fits longitudinally into the other when in storage configuration. Each of the two tubes contains a slot at one end which is operative to hold the saw blade when the saw in is a functional configuration. In the functional configuration, the non-slotted end of the thin tube abuts against the cylindrical side wall of the wider diameter tube at a substantially perpendicular orientation. The saw blade is held in the saw blade slots at the opposite ends of the two tubular pieces. A tensioning device comprising a screw with a hook on one end and a thumb nut is then used to exert tension on the saw blade. The hook of the tensioning screw fits into a hole on the cylindrical side wall of the thin tube and the shaft of the tensioning screw pushes through two holes in the cylindrical side walls of the wider tube, where it engages the thumb nut. In the compact configuration, the saw blade slides longitudinally into the thin tube, which, in turn, slides longitudinally into the wider tube. The hooked end of the tensioning device also slides into the tube assembly, leaving the shaft of the tensioning screw pushing through the circular end of the wide tube where it engages the thumb nut, and operates to hold the compact apparatus closed.

The problems with the Allen design are best illustrated with reference to the figures in that patent document. FIGS. 8 and 9 depict the tensioning screw 18 with its shaft having a straight piece 90 with threads 98 and a bent section 96 with a hook 94. In FIG. 1, the saw is shown in its functional configuration. The problem with the design is that, while exerting sufficient force in the horizontal direction (i.e. along the thin tube 50), the tensioning screw exerts relatively little force in the vertical direction (i.e. along the wide tube 12). The slotted end 68 of the thin tube 50 is susceptible to being vertically displaced during a sawing motion. Consequently, the saw is not sufficiently rigid for heavy duty sawing applications and may break or come apart, subjecting the user to unnecessary danger.

A second disadvantage of the Allen design is the extra length of the compacted configuration that is required to accommodate the thumb nut of the tensioning device.

A final disadvantage with the Allen design is that the thumb nut of the tensioning device may be easily lost, particularly in the wilderness, rendering the device useless In view of the foregoing disadvantages inherent in the known types of collapsible hand saws as taught in the prior art, the present invention serves a number of objectives.

It is a primary object of the present invention to provide a lightweight and portable saw that is collapsible into a single tubular shape, but may be configured to function as a triangular saw or both a triangular saw and a buck saw. These alternative configuration modes permit the apparatus herein disclosed to be used for both triangular saw applications (i.e. when there is limited room or a stronger saw is needed and when clearance between the blade and the top support bar is not important) and buck saw applications, which require a substantial clearance between the blade and the top support bar.

A second object of the present invention is to provide a saw without unnecessary torque on the saw blade that could cause the saw blade to break and possibly put the user's safety in jeopardy.

Another object of the present invention is to provide for a lightweight portable saw that may be converted easily into an outdoor cooking utensil with the addition of some simple accessories.

Another object of the present invention is to provide an apparatus which is stable, as small as possible, has the fewest number of pieces, has no small parts which may be easily lost and is lightweight, so that it may be easily carried while hiking or working outdoors on a tool-belt or a backpack.

Another object of the present invention is to provide an apparatus which is easily assemblable and dissassemblable into any of its various configurations.

SUMMARY OF THE INVENTION

The invention herein disclosed concerns an apparatus for a lightweight collapsible hand saw. The hand saw apparatus comprises two hollow tubular members, a first of which is longer and has a smaller diameter than the second, and the second being shorter and wider, such that the first tubular member is longitudinally insertable into the interior of the second. The apparatus also includes at least one saw blade that is couplable at each end to a corresponding one end of the first and second tubes and a tightening element that is couplable at each end to a corresponding one of the first and second tubular members on a cylindrical side wall or a circular end thereof.

The tightening element is comprised of a single non-severable assembly. Both the tightening element and the saw blades are longitudinally insertable into the interior of the first tubular member. The second tubular member has an opening in the middle of its cylindrical side wall which is operative to receive an end of the first tubular members, such that when the tubular members are joined in this manner, they are oriented substantially perpendicular.

The saw blade, tightening element and the two tubular members are couplable to one another so as to form a triangular saw configuration. In the triangular saw configuration, the proximate end of the first tubular member is inserted into the opening in the cylindrical side wall of the second tubular member. The saw blade then extends between a first bottom end of the second tubular member and the distal end of the first tubular member, and similarly, the tightening element extends between a second upper end of the second tubular member and the distal end of the first tubular member. The tightening element is operative to provide tension to the triangular saw configuration both in a direction parallel to the first tubular member and in a direction parallel to the second tubular member.

The saw blade, tightening element and the two tubular members are insertable into one another, so as to compact into a singular tube shaped storage configuration that is non-cumbersome and easily portable.

The first tubular member may include a reduced diameter section at the proximate end to aid in fitting snugly into the opening of the second tubular member. Advantageously, the proximate end of the first tubular member may be formed in a half-round shape, so as to abut against and conform to the inner cylindrical wall of the second tubular member when inserted into the opening therein. The half-round shape is operative to substantially reduce the torque on both the saw frame and the saw blade.

The first and second tubular members may each include a slot in at least one end, which slot is operative to receive and secure an end of the saw blade. Preferably, distal end of the first tubular member may include a depression surrounding the slot in the cylindrical side wall of thereof, which is operative to further secure an end of the saw blade. The distal end of the first tubular member may also have a closing disk located within the tube, at a location coinciding with the depression. The closing disk may be operative to close off said distal end of said first tubular member, except for a slot which allows clearance for said saw blade.

The second tubular member may also be closed at the second upper end, but the upper end may comprise a plurality of small holes operative to receive an end of the tightening element, to receive a fixing element and to receive a rubber buffer.

Advantageously, the first and second tubular members may contain a plurality of holes in the cylindrical side walls and on the ends thereof. The holes may be operative to receive an end of the tightening element. The tightening element may contain at hook at each end thereof. The hooks may be operative to secure the ends of the tightening element in the holes. The tightening element may also include an adjustment mechanism for changing the overall length of the tightening element.

The saw blade may include a cam at both ends which is operative to secure the saw blade in the slots of the first and second tubular members.

Preferably, the first tubular member may contain a protruding tongue and the second tubular member may contain an elongated opening, such that when the first tubular member is longitudinally inserted into the second, the tongue is operative to fit into the elongated opening and lock the tubular members together in the tube shaped storage configuration.

One of the first and second tubular members may include a fixing element operative to provide an easy attachment to the apparatus when in the tube shaped storage configuration.

The saw blade may be removed from the triangular saw configuration of the apparatus, and the apparatus may form an outdoor cooking utensil operative to hold a cooking vessel over a heat source. The cooking vessel may be a pot, kettle, grill or rotisserie.

Another aspect of this invention involves an apparatus for a lightweight collapsible hand saw comprising three hollow tubular members of various lengths and widths. The first tubular member is the longest and thinnest, the second tubular member is shorter with a medium diameter and the third is also short and has the largest diameter. The, three tubular members slide longitudinally into the interior of one another. Furthermore, the second and third tubular members include openings in the cylindrical side walls thereof. The openings are operative to receive the ends of the first tubular member which can be inserted into the openings so as to form a substantially right angle. The apparatus also comprises a saw blade which is couplable at each end to a corresponding one of the first, second and third tubular members and can slide longitudinally into the interior of the first tubular member. Finally, the apparatus includes a tightening element that is couplable at each end to a corresponding one of the first, second and third tubular members. The tightening element is couplable to the tubular members on the circular ends or the cylindrical side walls thereof and can slide longitudinally into the interior of the first tubular member.

The saw blade, tightening element and the three tubular members are longitudinally insertable into one another so as to compact into a singular tube shaped storage configuration which is non-cumbersome and easily portable. The saw blade, tightening element and the three tubular members are also couplable to one another so as to form a triangular saw configuration and a buck saw configuration.

The saw blade, tightening element and two of the three tubular members may be configured so as to form a triangular saw.

The first tubular member may include a reduced diameter section at a first end to aid in fitting snugly into the opening of the second tubular member. The first tubular member may have both of its ends shaped so as to conform to the inner cylindrical walls of the second and third tubular members when inserted into the openings therein. The half round shape may be operative to substantially reduce the torque experienced by the saw frame and the saw blade when in the triangular saw or the buck saw configuration.

Each of the three tubular members may contain a slot in at least one end which is operative to receive and secure an end of the saw blade. Preferably, one end of the first tubular member may include a depression surrounding the slot in the cylindrical side wall of thereof, which is operative to further secure an end of the saw blade.

The second and third tubular members may be closed at one end, but the closed ends may contain a plurality of small holes operative to receive an end of the tightening element, to receive a fixing element and to receive a rubber buffer. Alternatively or in addition, the first, second and third tubular members may contain holes in the cylindrical side walls or on the ends thereof, which are operative to receive the ends of the tightening element. The tightening element may contain at hook at each end. The hooks may be operative to secure the ends of the tightening element in the holes. The tightening element may also include an adjustment mechanism for changing the overall length of the tightening element.

The saw blade may include a cam at each end which is operative to secure the ends of the saw blade in the slots of the tubular members.

Preferably, the second tubular member may contain a protruding tongue and the third tubular member may contain an elongated opening, such that when the second tubular member is longitudinally inserted into the third, the tongue is operative to fit into the elongated opening and lock the tubular members together in the tube shaped storage configuration.

The second tubular member may include a rubber buffer at one end, such that the second tubular member fits snugly when longitudinally inserted into said third tubular member.

One of the second or third tubular members may also include a fixing element which facilitates easy coupling to the apparatus when it is in the tube shaped storage configuration.

The saw blade may be removed from the apparatus and an earth pin may be added to the apparatus. The earth pin may be partially insertable into the one of the second or third tubular members and is operative to secure the apparatus such that it may stand freely in the ground. The earth pin may allow the apparatus to be configured as a vertically adjustable and pivotable outdoor cooking utensil operative to hold a cooking vessel over a heat source. The vertically adjustable and pivotable outdoor cooking utensil may further comprise a cooking vessel chosen from the group of: a pot, a kettle, a grill, and a rotisserie.

A third aspect of this invention involves an apparatus for a lightweight collapsible hand saw comprising three hollow tubular members of various lengths and widths. The first tubular member is the longest and thinnest, the second tubular member is shorter with a medium diameter and the third is also short and has the largest diameter. The three tubular members slide longitudinally into the interior of one another. Furthermore, the second and third tubular members include openings in the cylindrical side walls thereof. The openings are operative to receive the ends of the first tubular member which can be inserted into the openings so as to form a substantially right angle. The apparatus also comprises a saw blade which is couplable at each end to a corresponding one of the first, second and third tubular members and can slide longitudinally into the interior of the first tubular member. Finally, the apparatus includes a tightening element that is couplable at each end to a corresponding one of the first, second and third tubular members. The tightening element is couplable to the tubular members on the circular ends or the cylindrical side walls thereof and can slide longitudinally into the interior of the first tubular member.

The saw blade, tightening element and the three tubular members are longitudinally insertable into one another so as to compact into a singular tube shaped storage configuration which is non-cumbersome and easily portable. The saw blade, tightening element and the three tubular members are also couplable to one another so as to form a buck saw configuration.

DESCRIPTION OF THE PREFERRED EMBODIMENT

With reference to the FIGS. 1 through 9 the collapsible and portable hand saw system embodying the principles and concepts of the present invention is hereinafter described.
The First Embodiment FIG. 8 depicts the parts of the first embodiment when disassembled. The apparatus of the first embodiment includes two tubular members 1 and 2 having different diameters, a saw blade 6 and a tightening element 8. The apparatus is normally arranged in one of two configurations; a compacted configuration used for carrying the device and a functional configuration used for a triangular saw.

Tube 1 has the smallest diameter, but, being approximately the length of the saw blade 6, is the longest of the tubular members. Tube 1 includes holes 22 for coupling to the tightening element 8 and a slot 5 at one end 26 for insertion of the saw blade 6. The slotted end 26 also includes a depression 28 which is used to assist in bracing the saw blade in the slot. At the opposing end 25 of tube 1, the diameter is reduced in a small section 23 and the end 25 is shaped in a "half-round" form so as to conform to the inner diameter of the shorter tube 2 for coupling thereto. The half-round shaped end 25 includes two convex sections, which are bisected by the plane of the slot 5. This orientation of the slot 5 with the convex ends is integral to reducing the lateral torque on the saw blade when the apparatus is in a functional configuration. Tube 1 also includes a tongue 20 used to couple it to tube 2 when in the compacted configuration. Tube 1 also includes a closing disk 27 inserted into one end of the tube, so as to contain the saw parts in the compacted configuration.

Tube 2 is the shorter and wider of the two tubes and includes a round end plate 13 which closes it on one side. The end plate 13 has a hole 12 that is operative to receive the hooks 10 of the tightening element 8. The short tube 2 may alternatively include holes (not shown) for mounting the tightening element 8 on the cylindrical side wall of the tube, such that end plate 13 could be completely closed. A further hole (not shown) may be included in the end plate 13 for attaching a fixing element (not shown) so that the device may be easily coupled to a backpack or tool belt. A rubber buffer 16 is also inserted into the end of tube 2 and attaches to end plate 13. The buffer 16 is operative to reduce the rattling and provide some elasticity to the closure mechanism when the apparatus is in the compact configuration. At the opposing end from the end plate 13, the shorter tube 2 includes a slot 42 for insertion of the saw blade 6. Near the center of the short tube 2, in the same plane as slot 42, is an opening 4 on the cylindrical side wall of the tube. The opening is sized and shaped to receive the reduced diameter end 25 of the thinnest tube 1. The opening 4 also has a rounded extension 14, which serves as a lock opening, receiving the tongue 20 from the tube 1, so as to keep the apparatus fastened together when in the storage configuration.

The saw blade 6 comprises two cams 7 positioned at each end, which are used to secure the blade 6 in the slots 5 and 42 of tubes 1 and 2 respectively. A plurality of saw blades may be included in the apparatus for various types of sawing applications.

The tightening element 8 is comprised of two threaded bars, the outer ends of which are formed into hooks 10. Also included in the tightening element 8 is the adjustment mechanism 9, which is used to adjust the overall length of the tightening element 8. The threaded bars are notched at the inner ends (not shown) so that the adjustment mechanism 9 can not be completely separated from the tightening element 8, reducing the chances the pieces of the tightening element could be accidentally lost.

Figures 9, 10:
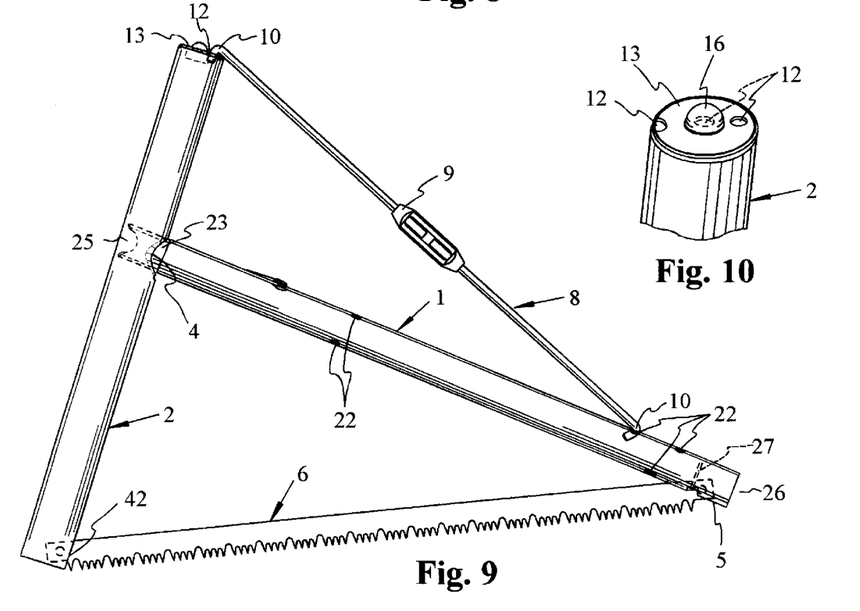
FIG. 9 depicts the first embodiment of the apparatus in the triangular saw configuration.
FIG. 10 depicts a front view of the end plate.

FIG. 9 depicts the first embodiment of the apparatus in the triangular saw configuration. The reduced diameter end 25 of long tube 1 is plugged into the opening 4 of tube 2 in such a way that the slot 5 at the distal end 26 of tube 1 is oriented parallel with the slot 42 in tube 2. The saw blade 6 is inserted into the slots 5 and 42 of tube 1 and 2 respectively and is secured in place by tightening element 8, which is fitted into the hole 22 of the long tube 1 and in the hole 12 in the end plate 13 of tube 2. Tube 2 then becomes a handle and is used as a regular triangular saw by moving blade 6 back and forth across the surface to be cut (not shown).

Figure 7A:
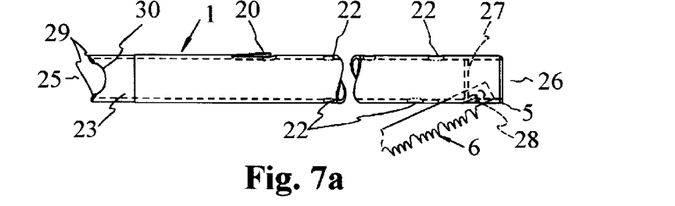
FIG. 7a depicts a side view of the ends of the thin tube 1 in the second embodiment.
Figure 7B:
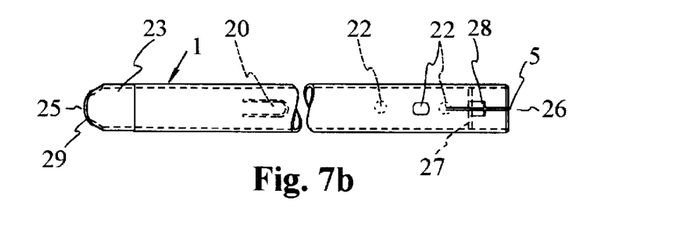
FIG. 7b depicts a top view of the ends of the thin tube 1 in the second embodiment.
Figure 8:
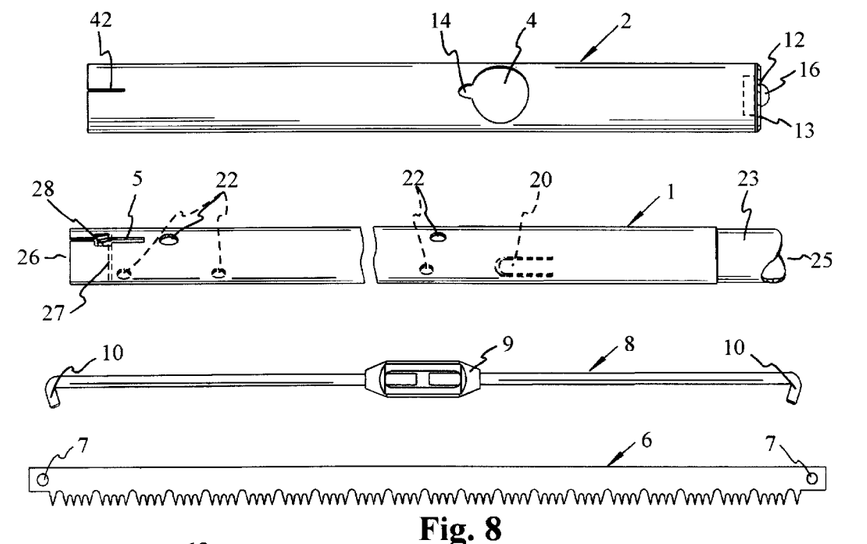
FIG. 8 depicts the separate parts of the first embodiment.

An important aspect of the invention is depicted in FIGS. 7a and 7b that show how the slot 5 of the slotted end 26 is aligned with the half round end 25 of tube 1. The half round end 25 has two convex portions 29 and two concave portions 30. The alignment of the convex portions 29 so that they are bisected by the plane of the slot 5 is crucial to ensure that the half-round end 25 fits snugly against the inner cylindrical wall of tube 2 (not shown). This orientation substantially reduces the lateral torque on the saw blade (not shown).

Referring back to FIG. 9, the saw can be configured as a campfire cooking utensil by removing the saw blade 6 and fixing tube 2 vertically. This leaves tube 1 substantially horizontal where it can extend over a heat source (not shown). A pot with a wire handle can then be hung over the heat source from the extended portion of tube 1.

Referring now to FIG. 8 again, to put the apparatus in the compact configuration, the saw blade 6 and the tightening element 8 are inserted longitudinally into the open end 25 of tube 1. The open end 25 of tube 1 is then inserted longitudinally into tube 2. The tongue 20 on tube 1 and the elongated opening 14 on tube 2 provide a locking mechanism which locks the compacted assembly together. The tongue 20 extends outward from the tube 1. Pressure from the saw blade 6 and the rubber buffer 16, provide the necessary elasticity to ensure that the locking mechanism engages. To unlock the assembly, tongue 20 must be pushed back into the tube and then tube 1 may be slid out from within tube 2.

The Second Embodiment

Figure 3:
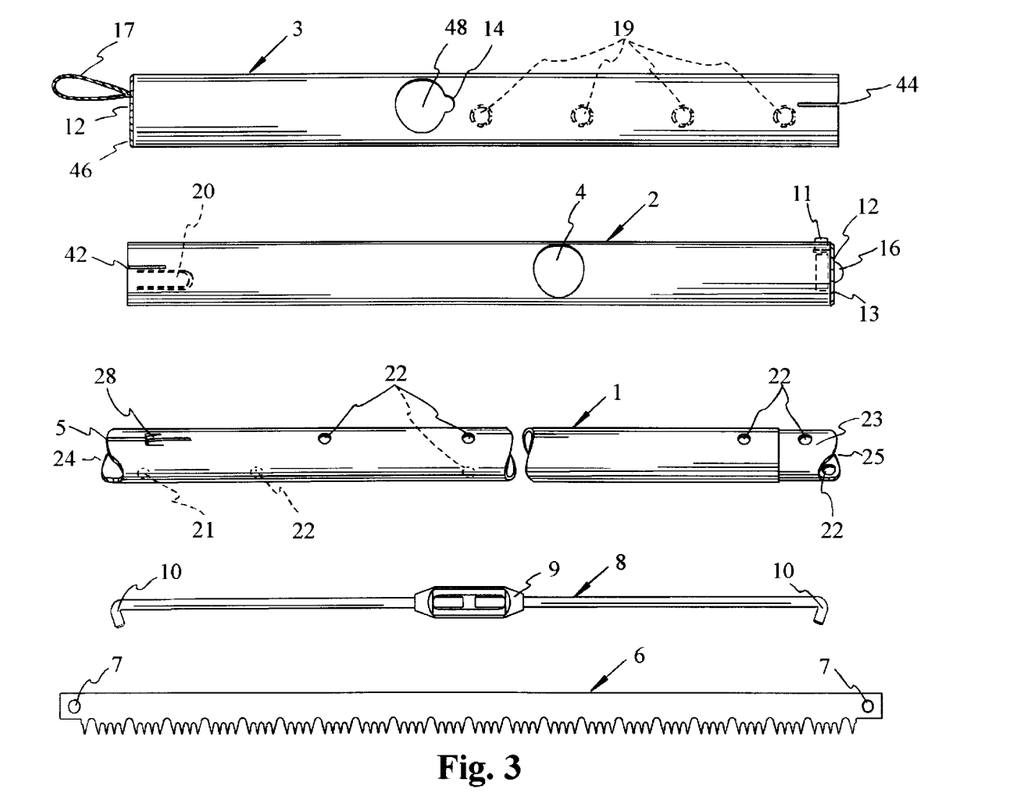
FIG. 3 depicts the separate parts of the second embodiment of the apparatus.

FIG. 3 shows the parts of the second embodiment when disassembled. The apparatus according to the invention includes three tubular members 1, 2, and 3 having different diameters, a saw blade 6 and a tightening element 8.

Tube 1 has the smallest diameter, but, being approximately the length of the saw blade 6, is the longest of the three tubular members. Tube 1 includes a hole 22 for coupling to tightening element 8 and a slot 5 at one end for insertion of the saw blade 6. One of the slotted ends 24 also includes a depression 28 used to assist in bracing the saw blade 6 in the slot 5. At the opposing end 25 of tube 1, the diameter is reduced in a small section 23 for coupling to the medium sized tube 2. The ends of the tube 1 are formed in a "half-round" shape so as to conform to the inner diameters of the shorter tubes 2 and 3 for the purpose of coupling thereto. The half-round shapes include two convex sections, which are bisected by the plane of slot 5. This orientation of slot 5 with the convex ends is integral to reducing the torque on the saw blade when the apparatus is in a functional configuration. Tube 1 also contains several other holes 22 in the cylindrical side wall thereof, for use in coupling to the tightening element and for a campfire cooking utensil.

Tubes 2 and 3 are the shorter tubes and each includes a round end plates 13 and 46 respectively which closes them on one side. The end plates 13 and 46 may have a hole 12 in each, which is operative to receive the hooks 10 of the tightening element 8. The short tubes 2 and 3 may alternatively include holes 19 for mounting the tightening element 8 on the cylindrical side wall of the tubes, such that end plates 13 and 46 on the ends of the short tubes 2 and 3 respectively could be completely closed. A further hole may be included in the end plates 13 and 46 to serve for the reception of a fixing element 17 or the rubber buffer 16. The buffer 16 is operative to reduce the rattling and provide some elasticity to the closure of the apparatus when it is in the compact configuration. The buffer 16 is inserted into the closed end of tube 2 and attached to the end plate 13. At the opposing end from the round plates 13 and 46, the shorter tubes 2 and 3 include slots 42 and 44 respectively for insertion of the saw blade 6. Near the center of the short tubes 2 and 3 are openings 4 and 48 respectively on the cylindrical side wall of the respective tubes. The openings 4 and 48 are sized and shaped to receive the ends (25 and 24) of the thinnest tube 1. Another feature on the cylindrical side walls of tube 3 are the holes 19 which are used for the height adjustment mechanism for the campfire cooking utensil.

Tube 2 includes tongue 20 on its cylindrical side wall, while the opening 48 of tube 3 includes a rounded extension 14, which serves as a lock opening, receiving the tongue 20 from tube 2. The tongue 20 engages the extension 14 so as to keep the parts of the saw fastened together when in the storage configuration.

The saw blade 6 comprises two cams 7 positioned at each end which are used to secure the blade 6 in the slots 5, 42 and 44 of tubes 1, 2 and 3 respectively. A plurality of saw blades may be included in the apparatus for various types of sawing applications.

The tightening element 8 is comprised of two threaded bars, the outer ends of which are formed into hooks 10. Also included in the tightening element 8 is the adjustment mechanism 9, which is used to adjust the overall length of the tightening element 8. The threaded bars are notched at the inner ends (not shown) so that the adjustment mechanism 9 can not be completely separated from the tightening element 8, reducing the possibility that the pieces of the tightening element could be accidentally lost.

In connecting with one another, the long tube 1 may be slotted into either, or both, of the openings 4 and 48 in the cylindrical side walls of the shorter tubes 2 and 3 respectively. The small diameter end 25 of tube 1 is insertable into tube 2, while the wider end 24 of tube 1 is insertable into the widest tube 3. The bump 21 on the wide end 24 of tube 1 ensures that the wide end will only fit into the opening 48 of tube 3, which has the rounded extension 14. The "half-round" ends of the long tube 1 abut directly against the inner cylindrical side walls of the wider tubes 2 and 3. The saw blade 6 is insertable into the slots 5, 42 and 44 of tubes 1, 2 and 3 respectively and the hooks 10 of the tightening element 8 may be inserted into holes in the end plates 13 and 46 of tubes 2 and 3 respectively or the cylindrical side walls of the tubes 22.

Figure 1:
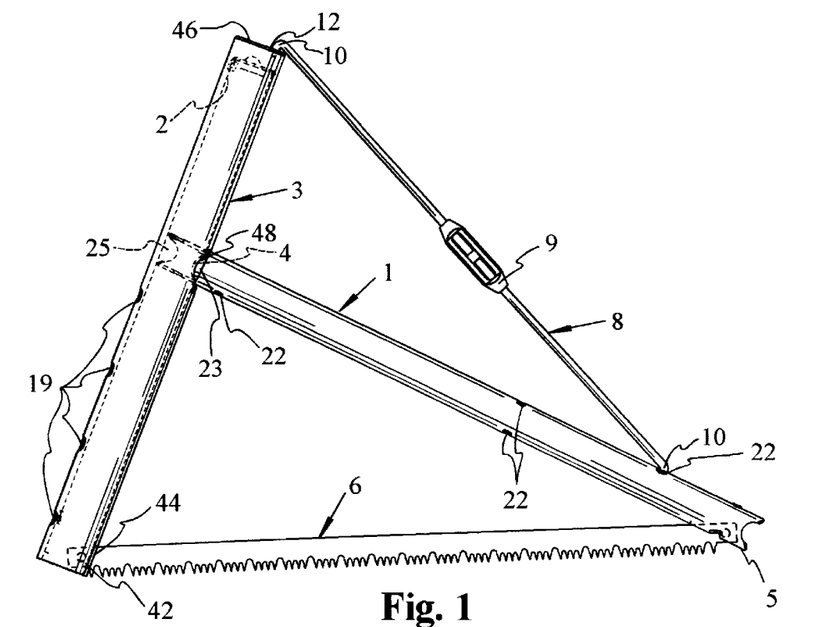
FIG. 1 depicts the second embodiment of the apparatus in the triangular saw configuration.

FIG. 1 depicts the apparatus in the triangular saw configuration. The short tube 2, having the medium sized diameter, is pushed into the widest tube 3 in such a manner that the openings 4 and 48 in the cylindrical side walls of both tube 2 and 3 are aligned, as are the slots 5 42 and 44 in tubes 2 and 3 respectively. Thereafter, the small diameter end 25 of long tube 1 is plugged into the opening 48 in such a way that the slot 5 at the distal end of tube 1 is oriented parallel to the slots 42 and 44 of tubes 2 and 3. The saw blade 6 is inserted into the slots 5, 42 and 44 and is secured in place by tightening element 8 which is fitted into the hole 22 of the long tube 1 and in the hole 12 of the short tube 3. The saw may then be gripped at handle 3 and used as a regular triangular saw by moving the blade 6 back and forth across the surface to be cut (not shown). An alternative configuration may be easily conceived of, wherein the largest diameter tube 3 is not used at all, and tube 2 is the only one used for the handle of the saw.

Figure 2:
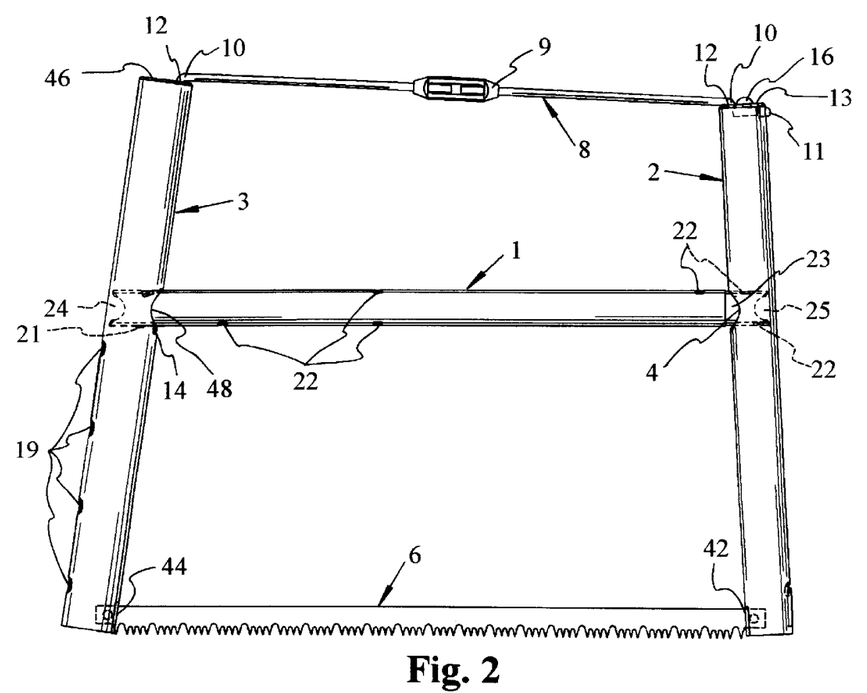
FIG. 2 depicts the second embodiment of the apparatus in the buck saw configuration.

FIG. 2 depicts the buck saw configuration of the invention. Each end of the long tube 1 is inserted into one of the openings 4 and 48 of the short tubes 2 and 3 respectively. The blade 6 is inserted in slots 42 and 44 of tubes 2 and 3 respectively. The hooks 10 of the tightening element 8 can then be inserted into holes 12 and the entire assembly can be tightened with the adjusting mechanism 9 until the necessary rigidity and sturdiness are achieved. The buck saw may then be gripped by one or two individuals at handles 2 and 3 and used as a regular buck saw by moving blade 6 across a surface.

Figures 5, 6A, 6B:
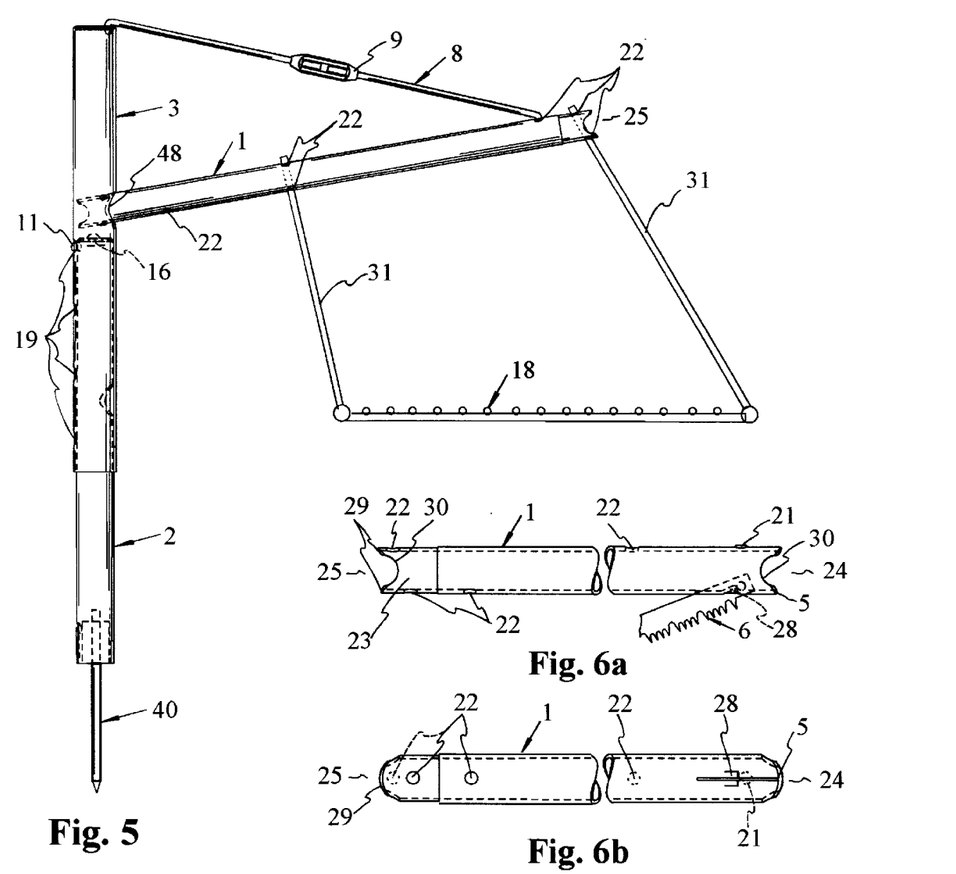
FIG. 5 shows how the second embodiment of the apparatus can be configured into an outdoor cooking utensil with the addition of some simple accessories.
FIG. 6a depicts a side view of the ends of the thin tube 1 in the second embodiment.
FIG. 6b depicts a top view of the ends of the thin tube 1 in the second embodiment.

An important aspect of the invention is depicted in FIGS. 6a and 6b that show how the slot 5 is aligned with the half round ends of tube 1. The half round ends have two convex portions 29 and two concave portions 30. The alignment of the convex portions 29 so that they are bisected by the plane of the slot 5 is crucial to ensure that the half-round ends fit snugly against the inner cylindrical wall of tubes 2 and 3 (not shown). This orientation substantially reduces the lateral torque on the saw blade (not shown).

FIG. 5 depicts the method in which the apparatus can be configured as an outdoor cooking utensil with the addition of a few simple accessories. At least two additional holes 22 are provided in the longest tube 1 for attaching the grill attachments 31 which are hinged to the actual grill 18. The accessory package may include the grill 18, a water pot (not shown), a pan (not shown), a hot plate (not shown) and other cooking utensils (not shown), which can be fit together for easy portability. The tubular members of the apparatus are configured as in the buck saw; however, the saw blade 6 (not shown in FIG. 5) is not included. Furthermore, tubes 2 and 3 are not inserted all the way into one another. The medium width tube 2 is inserted a short distance into the widest tube 3, the distance of penetration (and hence, the height of the apparatus above the heat source) being controlled by additional holes 19 in tube 3 and the button 11 (see FIG. 3) on tube 2. The button 11 is positioned next to the rubber buffer 16 in tube 2 so that when depressed it is biased to return to an extended position by the rubber buffer 16, ensuring a secure lock into the holes 19 of tube 3. An earth pin 40 with a plug at the end of it is inserted into tube 2 and is anchored into the ground to support the entire apparatus. The apparatus configured in this fashion provides for an adjustable height outdoor cooking utensil.

Figure 4:
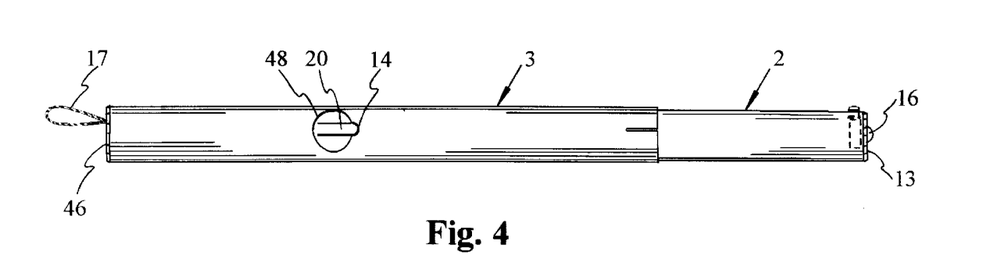
FIG. 4 depicts the second embodiment of the apparatus in the portable storage configuration wherein all of the saw parts are enclosed within a tubular portion of the saw frame.

FIG. 4 depicts the apparatus in its storage or compacted configuration. In order to fit all of the parts together into a single tubular shape, the tightening element 8 and the saw blade 6 must first be inserted into the interior of the long and thin tube 1. One end of the long tube 1 is then inserted into the medium diameter tube 2 while the opposite end of the long tube 1 is inserted into the largest diameter tube 3 in such a manner that tubes 2 and 3 enclose tube 1. Tube 2 meets tube 3 at the center and is inserted into tube 3 a short distance. The outer short tubes 2 and 3 include a locking mechanism which connects them together. The locking mechanism includes a tongue 20 on the medium width tube 2 which fits into the rounded elongation 14 of the opening 48 on the outer cylindrical wall of the widest tube 3. The tongue 20 extends outward and locks the two short tubes 2 and 3 into place. To unlock the assembly, the tongue 20 must be pushed back into the assembly and then tube 2 may be slid out from within tube 3. Twine 17 may be used to mount the apparatus onto a backpack.

A hand saw having such versatile applications can be helpful for a hiker, a boy scout, a forest ranger, a hunter, a camper and all those needing a lightweight portable hand saw.

The foregoing is considered illustrative only of the principles of the invention and numerous modifications and changes will occur readily to those skilled in the art. Consequently, it is not desired to limit the invention to the exact construction and operation shown and described.

What is claimed is:

1. A collapsible hand saw, comprising:
   a) two elongated hollow tubular members, comprising:
      i) a first elongated hollow tubular member; and
      ii) a second elongated hollow tubular member having a shorter length and a larger diameter than said first elongated hollow tubular member, such that said first elongated hollow tubular member is longitudinally insertable into an interior of said second elongated hollow tubular member;
   b) a saw blade; and
   c) an elongated tightening element, wherein said elongated tightening element is substantially equal in length to said saw blade;
   wherein said two elongated hollow tubular members are couplable to construct a saw frame, said saw blade is couplable to said saw frame and said elongated tightening element is couplable to said saw frame and operative to tension said saw blade.

2. The collapsible hand saw according to claim 1, wherein said second elongated hollow tubular member has an opening in a sidewall proximate a longitudinal center of said second elongated hollow tubular member operative to receive a first end of said first elongated hollow tubular member such that said first elongated hollow tubular member is arranged substantially perpendicular to said second elongated hollow tubular member.

3. The collapsible hand saw according to claim 2, wherein said first end of said first elongated hollow tubular member has a reduced diameter so as to insert snugly into said opening in said second elongated hollow tubular member.

4. The collapsible hand saw according to claim 3, wherein said first end of said first elongated hollow tubular member is formed in a half-round shape operative to abut and conform to an inner cylindrical wall of said second elongated hollow tubular member when said first end of said first elongated hollow tubular member is inserted into said opening in said sidewall of said second elongated hollow tubular member so as to substantially reduce torque on said saw blade.

5. The collapsible hand saw according to claim 4, wherein a second end of said first elongated hollow tubular member and a first end of said second hollow tubular member each include a longitudinal slot to receive and secure said saw blade.

6. The collapsible hand saw according to claim 5, wherein a first end of said saw blade is couplable to said slot in said second end of said first elongated hollow tubular member and a second end of said saw blade to said slot of said first end of said second elongated hollow tubular member.

7. The collapsible hand saw according to claim 6, wherein said slot of said second end of said first elongated hollow tubular member further includes a depression to further secure said first end of said saw blade.

8. The collapsible hand saw according to claim 7, wherein a slotted disk is secured within said first elongated hollow tubular member proximate said second end of said first elongated hollow tubular member such that a slot of said slotted disk is aligned parallel with said slot in said second end of said first elongated hollow tubular member to form a continuous slot.

9. The collapsible hand saw according to claim 8, wherein a first end of said elongated tightening element is couplable to a sidewall of said first elongated hollow tubular member and a second end of said elongated tightening element is couplable to said second end of said second elongated hollow tubular member.

10. The collapsible hand saw according to claim 9, wherein a perforated disk is secured within said second end of said second elongated hollow tubular member and perforations in said perforated disk are operative to receive said second end of said elongated tightening element and a rubber buffer.

11. The collapsible hand saw according to claim 2, wherein said first elongated hollow tubular member includes a protruding tongue and said second elongated hollow tubular member includes an aperture such that when said first elongated hollow tubular member is inserted longitudinally into said second elongated hollow tubular member, said protruding tongue engages said aperture to couple said first and second elongated hollow tubular members.

12. The collapsible hand saw according to claim 11, wherein said saw blade and said elongated tightening element are inserted into said first elongated hollow tubular member for storage.

13. The collapsible hand saw according to claim 5, wherein said first elongated hollow tubular member includes a plurality of holes proximate said second end of said first elongated hollow tubular member.

14. The collapsible hand saw according to claim 13, wherein said elongated tightening element includes:
   a) an adjustment mechanism operative to adjust an overall length of said elongated tightening element;
   b) a hook at a second end of said elongated tightening element, operative to secure said second end of said elongated tightening element to one of a plurality of holes in an end plate of said second elongated hollow tubular member; and
   c) a hook at a first end of said elongated tightening element, operative to secure said first end of said elongated tightening element to one of said plurality of holes proximate said second end of said first elongated hollow tubular member.

15. The collapsible hand saw according to claim 6, wherein said first end and said second end of said saw blade each include a cam operative to securely couple said first end of said saw blade in said second end of said first elongated hollow tubular member and to securely couple said second end of said saw blade in said first end of said second elongated hollow tubular member.

16. A collapsible hand saw, comprising:
   a) three elongated hollow tubular members, comprising:
      i) a first elongated hollow tubular member;
      ii) a second elongated hollow tubular member having a shorter length and a smaller diameter than said first elongated hollow tubular member, such that said second elongated hollow tubular member is longitudinally insertable into an interior of said first elongated hollow tubular member; and
      iii) a third elongated hollow tubular member having a longer length than said first elongated hollow tubular member and a smaller diameter than said second elongated hollow tubular member, such that said third elongated hollow tubular member is longitudinally insertable into an interior of said second elongated hollow tubular member;
   b) a saw blade; and
   c) an elongated tightening element, wherein said elongated tightening element is substantially equal in length to said saw blade;
wherein said three elongated hollow tubular members are couplable to construct a saw frame, said saw blade is couplable to said saw frame and said elongated tightening element is couplable to said saw frame and operative to tension said saw blade.

17. The collapsible hand saw according to claim 16, wherein said third elongated hollow tubular member has a circular cross-section, said first elongated hollow tubular member has an opening in a sidewall proximate a longitudinal center of said first elongated hollow tubular member operative to receive a first end of said third elongated hollow tubular member such that said first elongated hollow tubular member is arranged substantially perpendicular to said third elongated hollow tubular member and said second elongated hollow tubular member has an opening in a sidewall proximate a longitudinal center of said second elongated hollow tubular member operative to receive a second end of said third elongated hollow tubular member such that said second elongated hollow tubular member is arranged substantially perpendicular to said third elongated hollow tubular member.

18. The collapsible hand saw according to claim 17, wherein said second end of said third elongated hollow tubular member has a reduced diameter so as to insert snugly into said opening in said second elongated hollow tubular member.

19. The collapsible hand saw according to claim 18, wherein said first end and said second end of said third elongated hollow tubular member are formed in a half-round shape operative to abut and conform to an inner cylindrical wall of said first and second elongated hollow tubular members when said third elongated hollow tubular member is inserted into said opening in said sidewall of said first and second elongated hollow tubular members so as to substantially reduce torque on said saw blade.

20. The collapsible hand saw according to claim 17, wherein said second elongated hollow tubular member includes a protruding tongue and said first elongated hollow tubular member includes an aperture such that when said third elongated hollow tubular member is inserted longitudinally into said second elongated hollow tubular member and said second elongated hollow tubular member is inserted longitudinally into said first elongated hollow tubular member, said protruding tongue engages said aperture to couple said first and second elongated hollow tubular members.

21. The collapsible hand saw according to claim 16, wherein a first end of said first elongated hollow tubular member, a first end of said second hollow tubular member and a first end of said third hollow tubular member each include a longitudinal slot to receive and secure said saw blade.

22. The collapsible hand saw according to claim 21, wherein a first end of said saw blade is couplable to said first end of said first elongated hollow tubular member and a second end of said saw blade is couplable to said first end of said second elongated hollow tubular member.

23. The collapsible hand saw according to claim 22, wherein said first end and said second end of said saw blade each include a cam operative to securely couple said first end of said saw blade in said first end of said first elongated hollow tubular member and securely couple said second end of said saw blade in said first end of said second elongated hollow tubular member.

24. The collapsible hand saw according to claim 21, wherein said slot of said first end of said third elongated hollow tubular member further includes a depression operative to further secure said saw blade.

25. The collapsible hand saw according to claim 21, wherein a first end of said elongated tightening element is couplable to a second end of said first elongated hollow tubular member and a second end of said elongated tightening element is couplable to a second end of said second elongated hollow tubular member.

26. The collapsible hand saw according to claim 25, wherein an end plate is secured within said second end of said first and second elongated hollow tubular members and holes in said end plate within said second end of said first elongated hollow tubular member are operative to receive said first end of said elongated tightening element and holes in said end plate within said second end of said second elongated hollow tubular element are operative to receive said second end of said elongated tightening element.

27. The collapsible hand saw according to claim 26, wherein said elongated tightening element includes:

a) an adjustment mechanism operative to adjust an overall length of said elongated tightening element;

b) a hook at said first end of said elogated tightening element, operative to secure said first end of said elongated tightening element to one of said holes in said end plate of said first elongated hollow tubular member; and c) a hook at said second end of said elogated tightening element, operative to secure said second end of said elongated tightening element to one of said holes in said end plate of said second elongated hollow tubular member.

28. The collapsible hand saw according to claim 21, wherein said third elongated hollow tubular member includes a hole proximate said first end of said third elongated hollow tubular member.

* * * * *